(Model.)
C. H. EASTE & C. H. EASTE, Jr.
Harness Attachment.
No. 229,594.  Patented July 6, 1880.
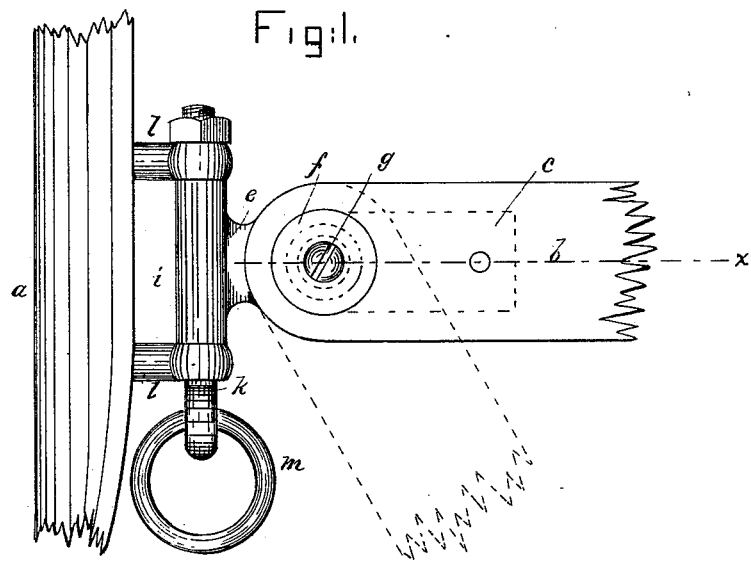
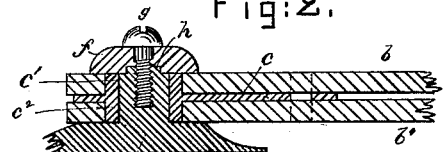
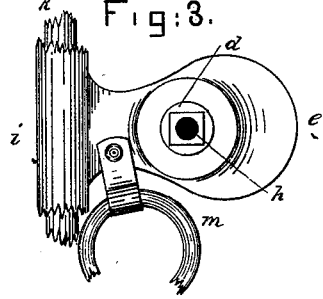
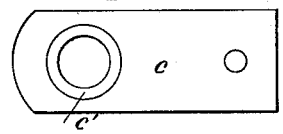
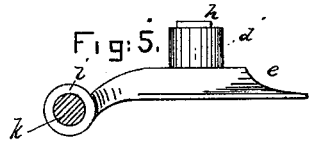
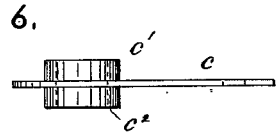
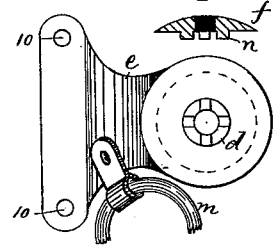
WITNESSES
V. D. Dearborn.
L. F. Connor.
INVENTORS
Charles H. Easte and
Charles H. Easte Jr
by Crosby & Gregory Attys

UNITED STATES PATENT OFFICE.

CHARLES H. EASTE AND CHARLES H. EASTE, JR., OF BOSTON, MASS.

HARNESS ATTACHMENT.

SPECIFICATION forming part of Letters Patent No. 229,594, dated July 6, 1880.

Application filed March 15, 1880. (Model.)

*To all whom it may concern:*

Be it known that we, CHARLES H. EASTE and CHARLES H. EASTE, Jr., both of Boston, county of Suffolk, State of Massachusetts, have invented an Improvement in Harness, of which the following description, in connection with the accompanying drawings, is a specification.

This invention relates to improvements in harness for horses wherein hames are employed; and our invention has especial reference to the means for connecting the traces with the hames, whereby the harness is made stronger, more durable, is easier to handle, keeps the traces in better shape when the harness is hung up, and stitching or sewing or riveting to join the trace to the hames or a permanent part thereof is obviated.

Figure 1 represents, in side elevation, part of a hame with the front end of a trace connected therewith in accordance with our invention, the full and dotted lines showing the trace in two positions; Fig. 2, a section along the line $x$, Fig. 1. Figs. 3, 4, 5, and 6 are details of the parts to be referred to, and Fig. 7 a modification.

The hame $a$ may be of any usual construction, and either of wood or iron in whole or in part.

The trace is composed of two thicknesses of leather, $b$ $b'$, between which is fitted a plate, $c$, preferably of metal, it having a hollow bushing, $c'$ $c^2$, projected from each side thereof through holes or openings made in the trace-pieces $b$ $b'$. (See Fig. 2.)

The bushing, the leather trace ends being fitted thereto and to the plate $c$, is slipped over the stud $d$, which rises from the trace-attaching or hame plate $e$, and a washer or nut, $f$, placed upon or at the end of the said stud, is secured there by means of a screw, $g$, to thus confine the trace to the stud of the said attaching-plate, but yet permit the trace to turn readily and freely about the said stud.

The upper end of the stud $d$ is provided with a nut-locking device, $h$, (shown in Figs. 2, 3, and 5 as an angular or cornered projection,) to enter a similar-shaped opening at the under side of the said washer $f$, to prevent it from turning as the trace and bushing turn upon the said stud, thus preventing any tendency of the screw or washer becoming detached.

This attaching-plate may be of any usual construction, and may be secured to the wood or iron hame in any usual way.

In Figs. 1, 3, and 5 the said plate has a socket portion, $i$, that is entered by a suitable bolt, $k$, by which to fasten the attaching-plate to the hame. This last attachment may be with ears $l$ $l$ of the hame, or the attaching-plate, as shown in Fig. 7, may be provided with holes 10 for the reception of bolts by which to join it with a hame. The attaching-plate or the bolt confining its socketed part $i$ with the hame will be provided with a ring, $m$.

Instead of the locking device shown in Figs. 2 and 3, we may notch the top of the stud transversely, as in Fig. 7, to receive lugs $n$ at the under side of the washer.

With the trace and attaching or hame plate, connected as described, we are enabled to avoid riveting the traces to a metal plate and also sewing.

The trace may be quickly and readily disconnected from the attaching-plate. The connection is very durable, strong, and cheap, and the trace vibrates freely about the stud $d$ when permitted so to do; and, also, when the harness is hung up or not in use the traces are permitted to hang down, as in dotted lines, or in even a more nearly vertical position, and the traces are not crooked or bent, so as to retain such crooked position when the harness is put upon the horse, as is now common in the old style of harness.

The bushing may be used between the traces and stud, even though the plate $c$ be omitted.

In this our invention the stud $d$ is solid, and is fixed to and forms part of the trace-attaching plate, and it cannot in use become detached from the said plate. Preferably they will be cast together as one piece.

We are aware that a hame-attaching plate has been provided with a socket to receive an annular hollow projection at one side of a plate riveted to the end of the trace, a bolt holding the hollow projection into the said socket; but in such plan the entire strain comes upon the small rivet, and it is soon broken or wears loose, becomes weakened thereby and rattles.

I claim—

1. In a harness, the attaching-plate and its stud combined with the bushing thereon, adapted to be extended through the trace end, substantially as described.

2. The trace $b\ b'$ and the plate $c$ and its bushing extended through the trace, combined with the attaching-plate and its stud, substantially as described.

3. In a harness, the attaching-plate adapted to be secured to the hame, and the stud $d$ on the plate, and the washer, bushing, and trace thereon, combined with the washer-locking device, to operate substantially as described.

4. The hame and the hame-attaching plate and its fixed stud $d$, to receive the bushing outside of it, the stud being provided with a central hole to receive the screw that attaches the washer to the stud, combined with the trace, substantially as described.

In testimony whereof we have signed our names to this specification in the presence of two subscribing witnesses.

CHAS. H. EASTE,
CHAS. H. EASTE, JR.

Witnesses:
G. W. GREGORY,
N. E. C. WHITNEY.